United States Patent [19]

Phan

[11] Patent Number: 4,967,408
[45] Date of Patent: Oct. 30, 1990

[54] TELEPHONE EXCHANGE INCLUDING SERVICE FEATURE APPARATUS

[75] Inventor: Khue V. Phan, Milpitas, Calif.

[73] Assignee: Northern Telecom Limited, Montreal, Canada

[21] Appl. No.: 330,475

[22] Filed: Mar. 30, 1989

[51] Int. Cl.[5] .......................................... H04Q 11/04
[52] U.S. Cl. ..................................... 370/62; 370/110.1
[58] Field of Search ................... 370/110.1, 58.1, 58.2, 370/62, 68.1

[56] References Cited

U.S. PATENT DOCUMENTS

| | | |
|---|---|---|
| 3,403,383 | 9/1968 | Kienzle et al. |
| 3,867,582 | 2/1975 | Weed et al. |
| 4,069,399 | 1/1978 | Barrett et al. |
| 4,371,752 | 2/1983 | Mathews et al. |
| 4,612,634 | 9/1986 | Bellamy ............................. 370/110.1 |
| 4,696,028 | 9/1987 | Morganstein et al. |
| 4,787,081 | 11/1988 | Waters et al. ........................ 370/84 |
| 4,788,682 | 11/1988 | Vij et al. ........................... 370/110.1 |
| 4,789,981 | 12/1988 | Yanosy, Jr. et al. ............. 370/110.1 |

*Primary Examiner*—Douglas W. Olms
*Assistant Examiner*—Melvin Marcelo
*Attorney, Agent, or Firm*—Foley & Lardner, Schwartz, Jeffery, Schwaab, Mack, Blumenthal & Evans

[57] ABSTRACT

A feature apparatus is arranged to share exclusive access, to a time division multiplex switching network, with another element of a telephone switching facility (PBX). The other element may be a line appearance group, or a service circuit. The feature apparatus is arranged within an equipment enclosure common to the switching facility, along with a power supply for supplying energizing current for operation of the switching facility and the feature apparatus so that the PBX may support a voice message feature for example, usually without an additional floor space requirement typical of other systems arrangements.

6 Claims, 3 Drawing Sheets

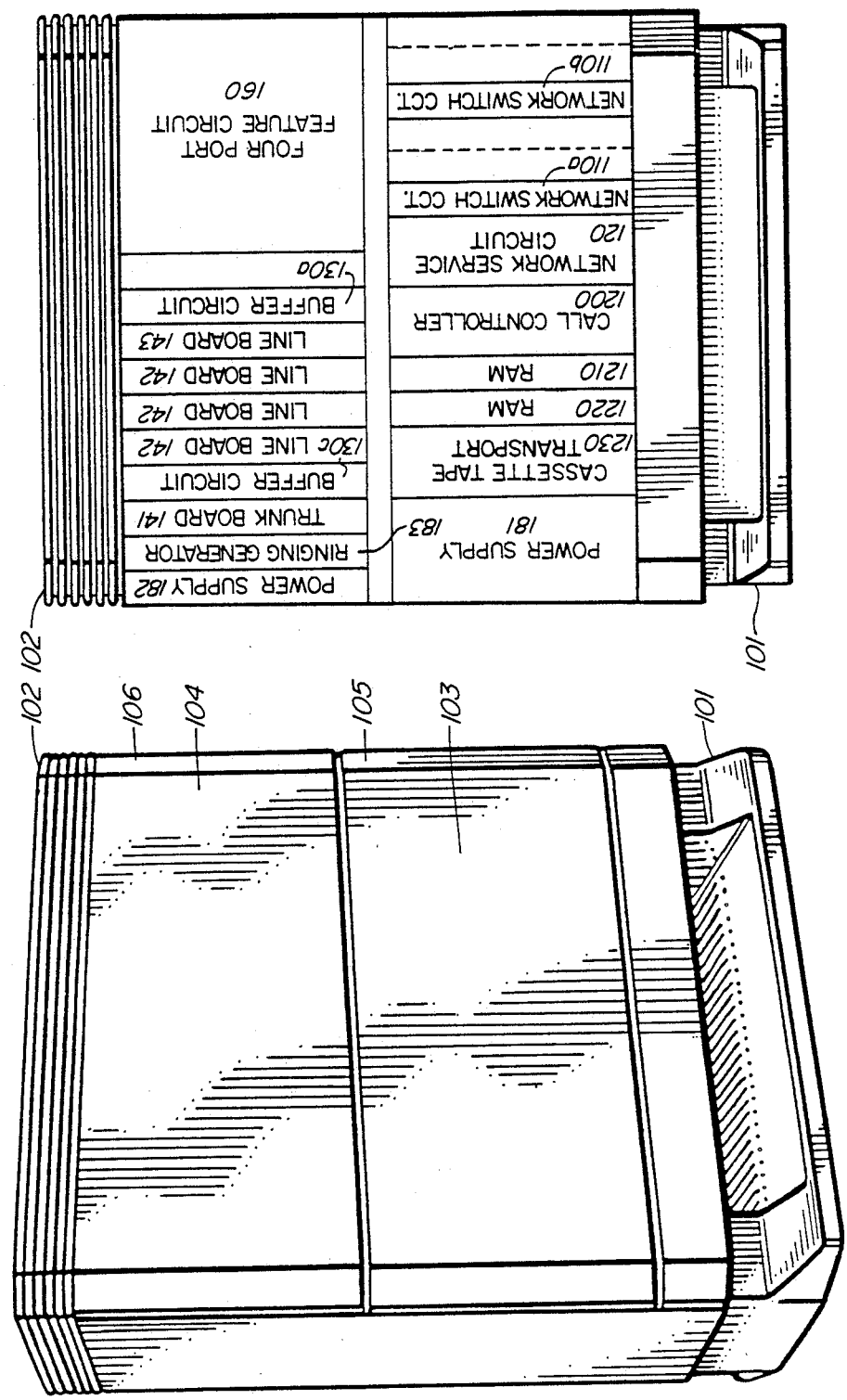

TELEPHONE EXCHANGE INCLUDING SERVICE FEATURE APPARATUS

INTRODUCTION

The invention is in the field of telecommunications systems which are operable to include a service feature and a special or customized telephony feature. More specifically the invention relates to provision of telephony features in association with a small telephone exchange, for example a small private branch exchange (PBX), wherein usage of the feature is infrequent but nevertheless considered to be essential.

BACKGROUND OF THE INVENTION

In the last ten to fifteen years, installations of computer controlled time division multiplexed flexible switching exchanges throughout telecommunications networks, both private and public, have become typical. This is particularly so in North America. With the more recent advent of deregulation of the telecommunications industry in the United States, manufacture of various telecommunications custom feature apparatus, by various entrepreneurial enterprises, has become common place. Although the principles required to provide many of these features have been the subject matter of a multitude of publications including many patents over the past twenty years or so, it has only been recently that such have amounted to more than paper proposals.

For example, one early suggestion that a store and forward message feature be provided in a telephone system was published in U.S. Pat. No. 3,403,383 on Sept. 24, 1968 by H. G. Kienzle et al. Kienzle et al propose that a digital signal compatible store and forward message module be coupled to serve a digital switching system with digital subscriber stations. Analog subscriber stations would be provided with the same service via an associated analog switching system and a digital/analog interface trunk. Data processing circuits common to both of the switches were to be instrumental in managing the store and forward message feature. However in spite of this and competing proposals of that general time frame, it was not until after 1984 that a telecommunications feature apparatus was manufactured by the assignee for digital signal trunk connection to a TDM PCM PBX.

In the last five years or so, more than one manufacturer has successfully supplied feature apparatus which may be installed in conjunction with almost any telephone switch, in a manner similar to that described in U.S. Pat. No. 4,371,752, issued on Feb. 1, 1983, to G. H. Mathews et al and titled "Electronic Audio Communication System". In this patent, feature apparatus is described as being connectable to a telephone switch by means of telephone lines identical to those used to connect analog telephone sets to the switch. The primary advantage of such an arrangement is that the feature apparatus is very easily connected and operated in combination with many of the telephone switching facilities presently in use.

Other examples of a feature apparatus which are of some interest are so called intercept apparatus. One such apparatus is describe by Weed et al in U.S. Pat. No. 3,867,582 issued on Feb. 18, 1975 and titled "REMOTE CONTROL FOR PRIVATE AUTOMATIC BRANCH TELEPHONE EXCHANGE". A more flexible intercept feature is disclosed in a recent U.S. Pat. No. 4,696,028 issued to S. J. Morganstein et al on Sept. 22, 1987, and titled "PBX Intercept And Caller Interactive Attendant Bypass System". Both of these examples have the advantage of being connectable to almost any telephone system by means of standard analog lines and/or trunks.

In each of these examples, the feature apparatus is of a nature that requires significant space in relation to the associated telephone switching equipment. That is to say that the apparatus stands alone or apart from the telephone switching equipment that it serves. This arrangement may carry advantages in that the switch operator or owner is not constricted to any particular manufacturer or supplier when purchasing a feature apparatus and maintenance service for same. However in relation to PBXs, and in particular PBXs as used by smaller business concerns, persons are likely to find it irksome to commit resources to coordinate equipment of dissimilar manufacture and service requirements. Furthermore, space adequate for the latest PBX technology of a few years ago is often inadequate to accommodate an additional, deemed necessary, feature apparatus.

An alternative arrangement may be that of incorporating a feature apparatus inside the switching equipment. Most features co-act with a call controller in the switching facility, in a manner similar to a service circuit in a typical switching facility. Some well known examples of service circuits are tone signalling receiver/senders, progress tone generators and the like. If a feature apparatus is incorporated at a typical service circuit position in the switching network of a PBX, as for example a PBX of present day manufacture by the assignee, the effect is that of providing at the very least thirty time division multiplexed (TDM) channels of full duplex access to the feature apparatus. Such access is essential for many of the service circuit functions, such as for example the prompt supply of dial tone and the capture of DTMF dialing information. However in smaller PBXs such access capacity is likely to go largely unused in relation to a voice message or automated attendant feature. Such unused capacity would nevertheless have to be purchased at significant cost.

It is an object of the invention to provide for a special or customized feature in a telephone switching exchange without incurring a network cost penalty, and without significantly infringing upon a previously adequate but less than abundant network traffic capacity.

It is also an object of the invention to provide for inclusion of a customized or special feature circuit within an equipment enclosure of a switching facility whereby a power supply resource associated with the switching facility is also committed to supporting the feature circuit.

SUMMARY OF THE INVENTION

In accordance with the invention a telephone switching facility is provided with a feature apparatus which is arranged to share access to a communications path in a switching network with a group of telephone line appearances.

According to one aspect of the invention the switching facility is operated in such a manner as to exclusively dedicate a predetermined plurality of the channels in the communications path for use in voice band communications with the feature apparatus, such that in the event that blocking occurs within the associated group of telephone line appearances, accessability of the feature apparatus via the switching network is not consequently altered.

According to another aspect of the invention the feature apparatus is arranged within an equipment enclosure of the switching facility whereby a power supply resource associated with the switching facility is also committed to supporting the feature apparatus.

In one arrangement, the switching facility includes a call controller and at least two TDM communications paths associated with a network switching circuit and a network service circuit. The network switching circuit provides network access for the feature apparatus and a group of line interface circuits via a peripheral circuit. The feature apparatus and the peripheral circuit are connected to operate in parallel, one with the other, for receiving signals from the network. However for transmitting signals to the network, they are multiplexed under control of a connection memory in the network switching circuit. A separate communication link between the feature apparatus and the call controller permits concert action to effect the feature as appropriate.

More specificly, the invention is manifest in a combination of a telephony service or feature apparatus with a telecommunications facility which is operable for providing communications channels, via a switching network, for various terminal apparatus and said service or feature apparatus, as directed by a call controller, in response to control actions executed by users of said terminal apparatus. The combination includes a network switch circuit having a connection memory for storing switching instructions from the call controller. A network receive port is connected to transfer signals from channels in communications paths in the switching network to the network switch circuit. A network transmit port is connected to transfer signals to channels in an associated communications path in the switching network from the network switch circuit. The network switch circuit also includes a peripheral address port, for providing terminal addresses from the connection memory, and a peripheral signal port, for transmitting signals received from the network and for receiving signals destined for the network, in accordance with said stored switching instructions. A peripheral buffer circuit includes an output line port, means for transferring signals from the peripheral signal port to the output line port, an input line port, means for transferring signals at the input line port to the peripheral signal port, and means for generating and distributing line enable signals in accordance with terminal addresses provided at the peripheral address port. A line circuit means is responsive to one of the line enable signals for interfacing an associated terminal apparatus with signals in a channel at the output line port and for interfacing signals from said terminal apparatus with the corresponding channel at the input line port. The feature or service apparatus is connected to the call controller and the peripheral signal port and is arranged to be responsive to command signals from the call controller and terminal addresses from the connection memory, for providing a telephony feature function in relation to duplex channels at the peripheral signal port as specified by the terminal addresses, said channels being specified from within a predetermined group of the channels in the communications path associated with the network switch circuit.

BRIEF DESCRIPTION OF THE DRAWINGS

An example embodiment is discussed with reference to the accompanying drawings in which:

FIG. 2 is a perspective view of an equipment cabinet suitable for housing the telecommunications switching facility illustrated in FIG. 1;

FIG. 3 is a block schematic diagram illustrating typical physical equipment locations within the equipment cabinet illustrated in FIG. 2.

DESCRIPTION OF THE EXAMPLE EMBODIMENT

Figure 1:
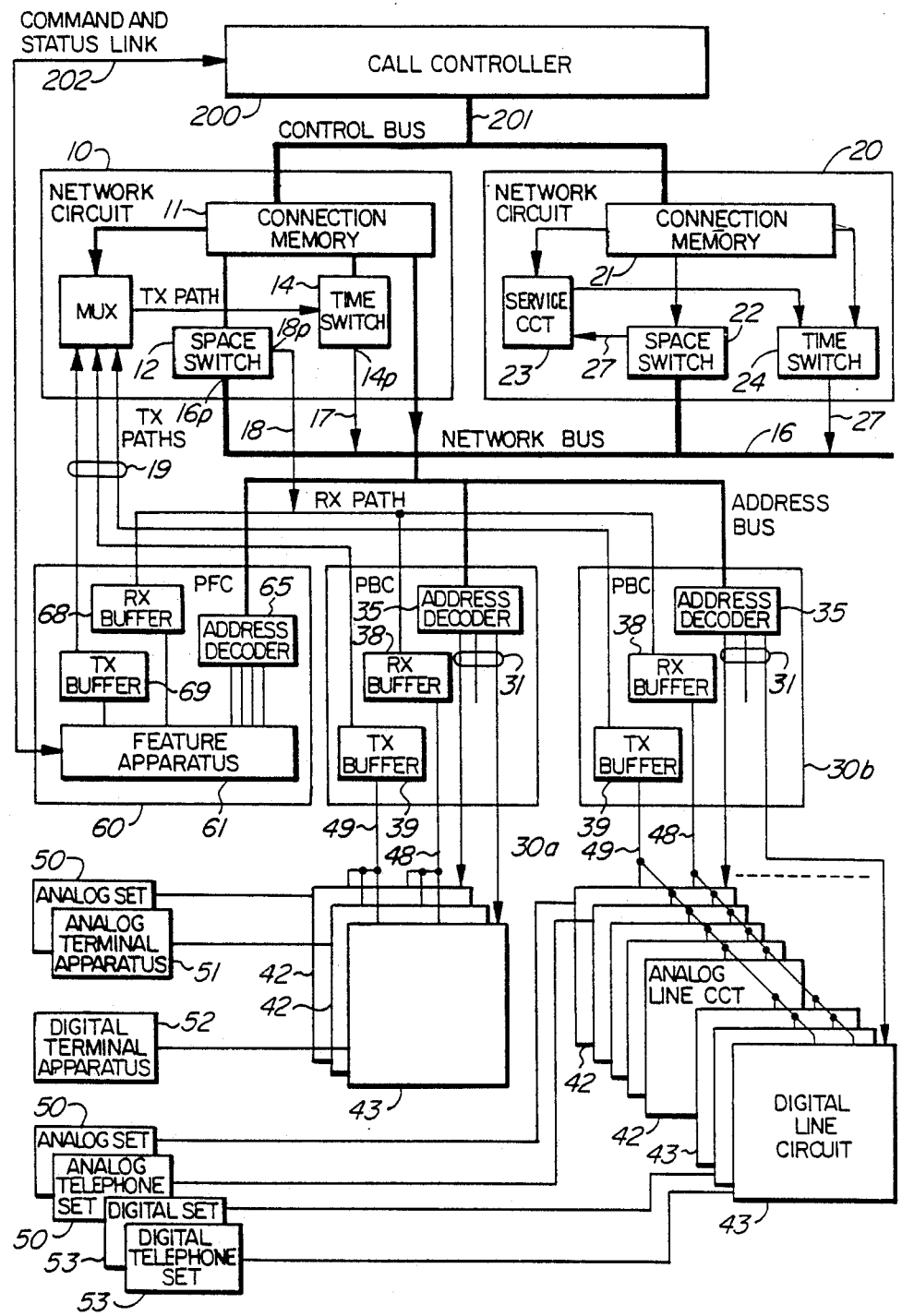
FIG. 1 is a block schematic diagram of a telecommunications switching facility in accordance with the invention.

The telecommunications facility illustrated in FIG. 1 provides channels for voice and data communications between various terminal apparatus. Such terminal apparatus are exemplified as elements 50-53 in FIG. 1. Any of the terminal apparatus 50-53 may communicate via an associated trunk facility, not shown, with terminal and feature apparatus associated with other telecommunications facilities, not shown. With the exception of a feature circuit 60, the facility illustrated in FIG. 1 is generally similar to the "TDM PCM Communication System" disclosed by B. R. Barrett and A. S. Chapman in U.S. Pat. No. 4,069,399 issued on Jan. 17, 1978.

In FIG. 1, a network bus 16 includes a plurality of communications paths for providing time division multiplex (TDM) communications channels between a plurality of network switch circuits, including a network switch circuit 10 and a network circuit 20. The communications channels are provided as directed by a call controller 200, which is responsive to control actions, (for example OFF HOOK, dialing, ON HOOK) executed by users of the telecommunications facility. The network switch circuit 10 includes a space switch 12, which functions under the control of a connection memory 11, to periodically receive a channelled signal from one of the communications paths in the network bus 16 via a network receive port 16p. The space switch 12 passes the signal on to a receive signal path 18. The channelled signal is received by each of a peripheral buffer circuit 30a, a peripheral buffer circuit 30b and a peripheral feature circuit 60. The peripheral buffer circuits 30a and 30b each include a receive buffer 38 which passes the signal on to analog line circuits 42, and digital line circuits 43, via respective peripheral receive lines 48. An address decoder 35 in each of the buffer circuits 30a and 30b, receives connection addresses from the connection memory 11 via an address bus 15. Address decoders 35 decodes the terminal address to provide an enable signal on one of leads 31 for a corresponding one of the analog line circuits 42 or the digital line circuits 43. Accordingly, the intended one of the associated terminal apparatus receives the signal destined for it. A signal originating at the terminal apparatus is likewise channeled onto a transmit signal path 19 in response to the enable signal. The signal is channeled via the associated line circuit, one of peripheral transmit lines 49 which terminates at a transmit buffer 39 in the associated peripheral buffer circuit. Signals are selected on a channel by channel basis from the transmit signal paths 19 by a multiplexer 13 in the network switch circuit 10 under the control of the connection memory 11 for transmission via a time switch 14 and a network transmit port 14p onto a network bus communications path 17 of the network bus 16.

The network switch circuit 20 is similar to the network switch circuit 10 in that it includes a control memory 21, a space switch 22 and a time switch 24. However it differs in that it includes a service circuit 23. The service circuit 23 is representative of any apparatus, for example a tones receiver/sender device, an audible announcement device, or the like. As in the case of the network switch circuit 10, the network circuit 20 also exclusively occupies an individual communications path 27, in the network bus 16. This arrangement is preferred in the case of a service or feature circuit which is intended to frequently serve many channels during a TDM frame occurrence, as is normal operation in the provision of tone signalling, progress tones and announcements for typical telephone system traffic. In both the network circuit 10 and the network circuit 20 the connection memory 11 and the control memory 21 communicate with the call controller 200 via a the control bus 201 for receiving and storing switching connection instructions.

In smaller installations of switching facilities, for example cost sensitive private branch exchanges (PBXs) of between fifty and one hundred and fifty lines and trunks, the addition of a service circuit to provide a special or custom feature can have a significantly deleterious effect on the overall operation of the PBX. In accordance with typical PBX structure, at least one of the communication paths in the network bus 16 is exclusively dedicated to each circuit in a network circuit position, regardless of the actual circuit function. This deleterious effect can be avoided with an addition of feature equipment separate and distinct from the PBX. However, use of a stand apart or stand alone apparatus, is not without consequent inconvenience as previously discussed. This inconvenience can be avoided in some PBXs by installing a features circuit in a manner similar to that illustrated in relation to the feature circuit 60.

The feature circuit 60 is connected to the receive signal path 18 in a manner similar to the buffer circuits 30a and 30b. The feature circuit 60 includes a feature apparatus 61 which is directly connected to be responsive to command signals from the call controller 200, via a command and status link 202. In this example the command and status link 202 is a RS-232 standard data link. The feature apparatus 61 is also connected to be responsive to predetermined terminal addresses from the connection memory 11 via an address decoder 65. In this case the address decoder 65 is arranged to enable full duplex communication in up to four channels via a receive buffer 68 and a transmit buffer 69. The feature circuit 60 provides a feature function at times as specified by the command signals. Communications signals originating in the feature apparatus 61 are permitted to be channeled via a predetermined fraction of the channels in the communications path 17. Signals destined for the features circuit 60 are selected by the space switch 12 from the network bus 16, in accordance with address information from the connection memory 11. These signals appear, without distinction along with other channelized signals via the peripheral signal port 18p of the network switch circuit 10, on the receive signal path 18. This arrangement provides for a low traffic special feature, being integrated within the PBX equipment cabinet without disproportionately infringing upon or requiring costly expansion of the capacity of the network bus 16.

In operation the peripheral feature circuit 60 mimics the functions of the peripheral buffer circuits 30a and 30b as far as the network switch circuit 10 is concerned. The receive buffer 68 passes all the channelled signals to the feature apparatus 61 and signals are channelled from the feature apparatus 61 via the transmit buffer 69 to the multiplexer 13 in the network circuit 10. Of course the multiplexer 13 requires appropriate selection information from the connection memory 11 to transfer these signals to the time switch 14 for channelized transmission on to the network bus 16.

The switching facility illustrated in FIG. 1 may conveniently be housed in an equipment cabinet as shown in FIG. 2. The equipment cabinet includes a base portion 101 which supports one or more modular equipment shelves 103 and 104, stacked in vertical order one on top of another. A louvered cap 102 rests upon the uppermost one of the equipment shelves. Covers 105 and 106 are removably fastened to the equipment shelves 103 and 104 primarily for aesthetic appearance.

In FIG. 3 the equipment cabinet is shown with the covers 105 and 106 removed, to illustrate a typical physical arrangement of apparatus and circuit boards. In FIG. 3, each element referred to is identified by a numerical label in the one hundreds range of numbers or in the one thousands range of numbers. In each case where lesser significant digits in the labels correspond to the numeric labels in FIG. 1 such correspondence is intended to indicate that these elements may be one and the same.

Referring to FIG. 3 a typical arrangement is shown. In the equipment shelf 103, a call controller 1200 is located next to random access memories 1210 and 1220, which contain appropriate instructions for operating the switching facility for functions of call progresses, feature access and maintenance diagnostics. A cassette tape transport 1230 provides one means for loading instructions into the RAMs 1210 and 1220 in an event of a system initialization. A back plane, not shown, is located behind the equipment shelf 103 and includes sufficient conductor paths, for example corresponding to elements 16, 17 and 27 in FIG. 1, for the exclusive connection of each of the network switch circuits 110a and 110b and a network service circuit 120, via their respective network transmit ports. Several spaces are illustrated as being vacant in the equipment shelf 103 of FIG. 1. These spaces are useful for extending the network capacity of the switching facility on an as needed basis, by the insertion of appropriate circuit boards. The equipment shelf 104, is shown to include a typical group of line circuit boards 142 and 143a, trunk circuit board 141 and associated buffer circuit boards 130a and 130b, which are supplied with operating and ringing voltages from a power supply 182 and a ringing generator 183.

A four port feature circuit unit 160 also resides on the equipment shelf 104 and receives appropriate operating voltages from the power supply 182. The feature circuit unit 160 and the buffer circuit board 130a are connected to receive signals via the peripheral receive signal path 18 from the network switch circuit 110b and to transmit signals to the network switch circuit 110b via the one of the peripheral receive signal paths 19. Operating instructions resident in the RAMs are such that the feature circuit unit 160 is limited to transmitting in up to four predetermined channels while the buffer circuit board 130a is able to transmit communication signals on at least a remaining twenty-six channels within each TDM frame.

This arrangement can be of significant advantage as the feature circuit unit 160 may be arranged to monitor any of the channels associated with the network circuit in a simplex configuration and thus abstain from contributing to the telephony traffic load during the provision of some features such as secondary DTMF signalling detection. For example in a voice message feature transmitting access may be limited to being provided on an as needed basis at moments when audible announcements or progress tones are required to be sent to a caller. In a typical call forward to voice message feature sequence, the caller does most of the talking and therefor during most of the call progress the simplex connection is sufficient and full duplex access is provided only as needed.

Figure 4:
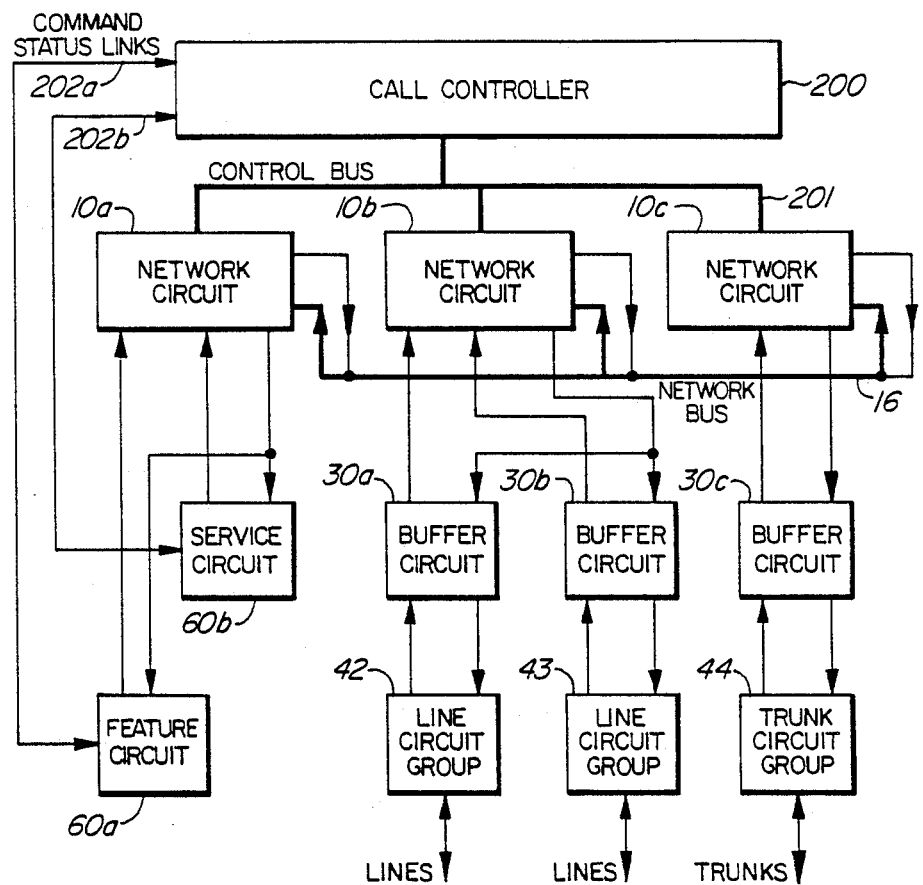
FIG. 4 is a block schematic diagram of a switching system similar to that illustrated in FIG. 1 but having an architecture adapted to longer call holding times as is sometimes typical of data communications.

The switching system illustrated in FIG. 4 show an alternate embodiment of the invention. Elements in FIG. 4 being similar to elements in FIG. 1 are similarly labelled. The switching system in FIG. 4 includes three network circuits 10a, 10b and 10c, connected to a call controller 200 via a control bus 201. The network circuit 10a provides access to the network bus 16 for a feature circuit 60a and a service circuit 60b. In this arrangement the feature circuit 60a and the service circuit 60b are each assigned a predetermined plurality of channels, the sum total of which amounts to the number of channels in the TDM frame on one of the communications paths in the network bus 16. Each of the circuits 60a and 60b is connected directly with the call controller via a command and status links 202a and 202b.

Peripheral buffer circuits 30a and 30b couple signals between the network switch circuit 10b and the respective line circuit groups 42 and 43 as before described in relation to FIG. 1. A peripheral buffer circuit 30c couples signals between a trunk circuit group 44 and the network switch circuit 10c. For simplicity of illustration, address buses and enable leads are omitted from the figure. Of contrast with respect to FIG. 1, the service circuit 60b in FIG. 4, being remote from any control memory, is controlled by a combination of the terminal addresses and command signals in a manner similar to the peripheral feature circuit in FIG. 1.

As before mentioned, this example is expected to be advantageous in private branch exchanges where holding times are on average longer than would be expected for normal voice telephony traffic. Thus system capacity can be enhanced by sharing the channels available, in a single TDM frame structure, between the service circuit 60a and the feature circuit 60b.

What is claimed is:

1. A telephone switching facility, for providing communications paths between telephone lines and trunks via a plurality of respective line and trunk interface circuits, for translating information signals between signal operating formats of the lines and trunks and a PCM operating signal format of the telephone switching facility, comprising:
    a group of interface circuits within said plurality of interface circuits;
    a call controller for directing operations of the switching facility;
    a plurality of network paths being operable in a TDM format of repetitive frames of channels for transmission of information signals;
    a feature apparatus for providing a telephony feature service via a plurality of channels of up to a first predetermined limit, concurrently;
    a network circuit for coupling information signals destined for any of the feature apparatus and an interface circuit within the group of interface circuits, from any of the channels of any of the network paths, provided that no two of said channels are concurrent; and for transmitting information signals from the feature apparatus via exclusively prededicated channels corresponding in number to the first predetermined limit; and for transmitting information signals from any of up to a second predetermined limit of interface circuits in the group of interface circuits, wherein the sum of the first and second predetermined limits is less than the sum of channels in one of the TDM frames;
    whereby in an event, during operation of the telephone switching facility, that blocking occurs within the group of interface circuits, such blocking is of no consequence as to accessability of the telephony feature service.
    a group of interface circuits within said plurality of interface circuits;
    a call controller for directing operations of the switching facility;
    a plurality of network paths being operable in a TDM format of repetitive frames of channels for transmission of information signals;
    a feature apparatus for providing a telephony feature service via a plurality of channels of up to a first predetermined limit, concurrently;
    a network circuit for coupling information signals destined for any of the feature apparatus and an interface circuit within the group of interface circuits, from any of the channels of any of the network paths, provided that no two of said channels are concurrent; and for transmitting information signals from the feature apparatus via exclusively prededicated channels corresponding in number to the first predetermined limit; and for transmitting information signals from any of up to a second predetermined limit of interface circuits in the group of interface circuits, wherein the sum of the first and second predetermined limits is less than the sum of channels in one of the TDM frames;
    whereby in an event, during operation of the telephone switching facility, that blocking occurs within the group of interface circuits, such blocking is of no consequence as to accessability of the telephone feature service.

2. A telephone switching facility as defined in claim 1 wherein the feature apparatus is arranged within an equipment enclosure common to the switching facility, along with a power supply means for supplying energizing current for operation of the switching facility including said feature apparatus.

3. A telecommunications switching facility comprising:
    a call controller;
    at least two TDM communications paths;
    a group of line interface circuits;
    a control bus;
    a network switching circuit, being connected by the control bus to be operable as directed by the call controller, for receiving signals from any of the TDM communications paths and for transmitting signals exclusively via a predetermined one of the TDM communications paths;

a buffer circuit being connected between the group of line interface circuits and the network switching circuit, for coupling signals between ones of the line circuits and the network switching circuit;

a network service circuit being connected by the control bus to be operable as directed by the call controller for receiving signals from any of the TDM communications paths and for transmitting signals exclusively via a predetermined one of the TDM communications paths;

a control link being connected to the call controller and being separate and distinct from the control bus; and a feature apparatus being connected to the network switching circuit and being operable in concert with the call controller via the control link to provide a predetermined telephony feature.

4. A telephone switching facility as defined in claim 3 wherein the feature apparatus is arranged within an equipment enclosure common to the switching facility, along with power supply means for supplying energizing current for operation of the switching facility including said feature means.

5. A telephone switching facility for providing communications channels, via a switching network, for various terminal apparatus and a feature apparatus, as directed by a call controller, in response to control actions executed by users of said terminal apparatus, comprising:

a network circuit including a connection memory for storing switching instructions from the call controller, a network receive port connected to transfer signals from channels in communications paths in the switching network, a network transmit port connected to transfer signals to channels in an associated communications path in the switching network, and a peripheral address port, for providing terminal addresses from the connection memory, and a peripheral signal port, for transmitting signals received from the network and for receiving signals destined for the network, in accordance with said stored switching instructions;

a peripheral buffer circuit including an output line port, means for transferring signals from the peripheral signal port to the output line port, an input line port, means for transferring signals at the input line port to the peripheral signal port, and means for generating and distributing line enable signals in accordance with terminal addresses provided at the peripheral address port;

a line circuit means for interfacing an associated terminal apparatus with signals in a channel at the output line port and for interfacing signals from said terminal apparatus with the corresponding channel at the input line port, in response to one of the line enable signals;

the feature apparatus being connected to the call controller and the peripheral signal port, the feature apparatus being responsive to command signals from the call controller, for providing a feature function in relation to channels at the peripheral signal port as specified by the command signals, wherein said specified channels correspond to some of the channels in the communications path associated with said network circuit.

6. A telephone switching facility as defined in claim 5 further comprising:

a service circuit including a connection memory for storing switching instructions from the call controller, an interface means for detecting and for generating telephony signalling on behalf of the call controller, a network transmit port connected to transfer the generated signalling to channels in an associated communications path in the switching network, and a network receive port connected to receive signals from channels in the communications paths in the switching network, in accordance with said stored switching instructions.

* * * * *